April 30, 1940.　　　H. O. SCHJOLIN　　　2,198,792
CLUTCH VENTILATION
Filed Dec. 17, 1937　　　2 Sheets-Sheet 1
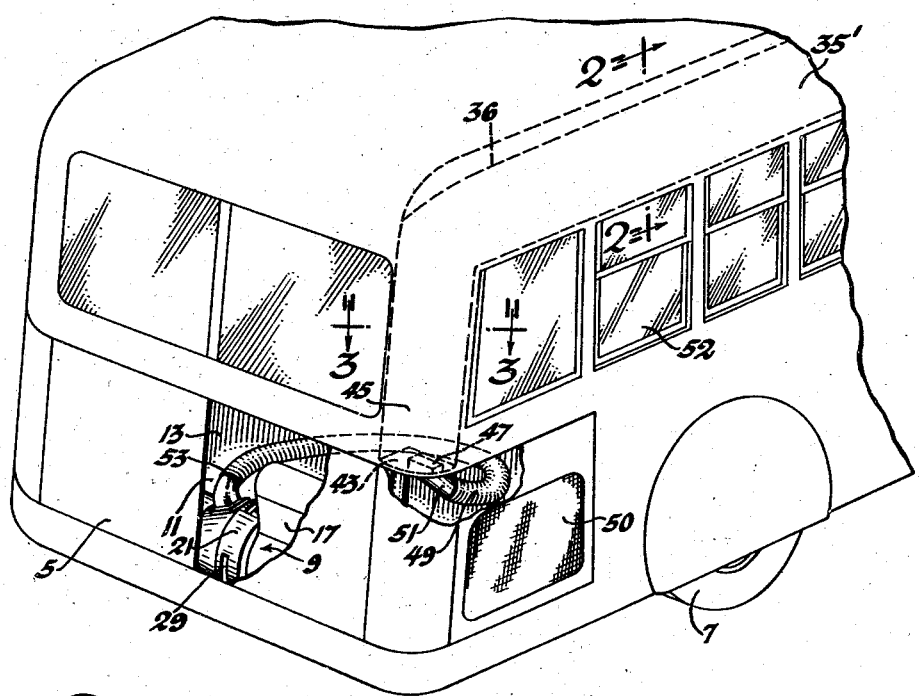
Fig. 1
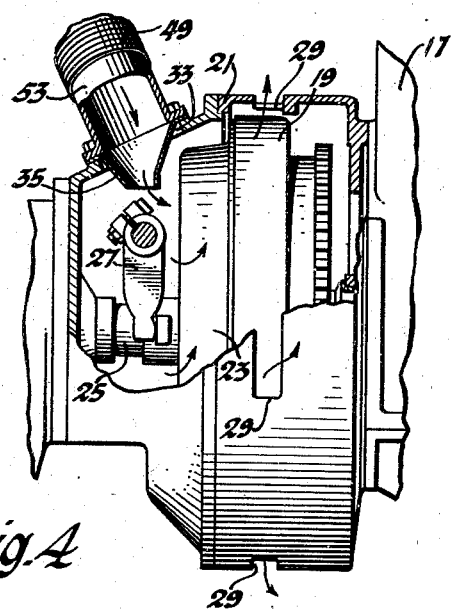
Fig. 2
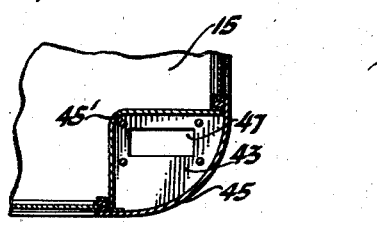
Fig. 3
Fig. 4
Inventor
Hans O. Schjolin
By Blackmon, Spencer & Hint
Attorneys April 30, 1940.  H. O. SCHJOLIN  2,198,792
CLUTCH VENTILATION
Filed Dec. 17, 1937  2 Sheets-Sheet 2

Inventor
Hans O. Schjolin
By
Attorneys

Patented Apr. 30, 1940

2,198,792

UNITED STATES PATENT OFFICE 2,198,792

CLUTCH VENTILATION

Hans O. Schjolin, Bloomfield Hills, Mich., assignor to Yellow Truck & Coach Manufacturing Company, Pontiac, Mich., a corporation of Maine Application December 17, 1937, Serial No. 180,291

2 Claims. (Cl. 180—54)

This invention relates to clutch ventilation and carburetor supercharging.

An object of the invention is to provide simple and comparatively inexpensive means to prevent the clutch of a motor coach from becoming overheated. It has been designed more particularly for installations having the power plant at the rear end of a large passenger carrying coach.

As a related object the invention embodies the idea of providing a modification of the flywheel element of the clutch whereby the air stream used for cooling the clutch may serve to supercharge the carburetor.

As a more specific object the invention aims to accomplish the major objects by using a current of relatively cool air which is free from foreign matter.

Other objects and advantages will be understood from the following description.

The invention is illustrated in the accompanying drawings wherein:

Figure 1 is a view in perspective of the rear end of a motor coach.

Figure 2 is a section on line 2—2 of Figure 1.

Figure 3 is a section on line 3—3 of Figure 1.

Figure 4 is a view in elevation, partly broken away, showing the power plant of the coach.

Figure 5:
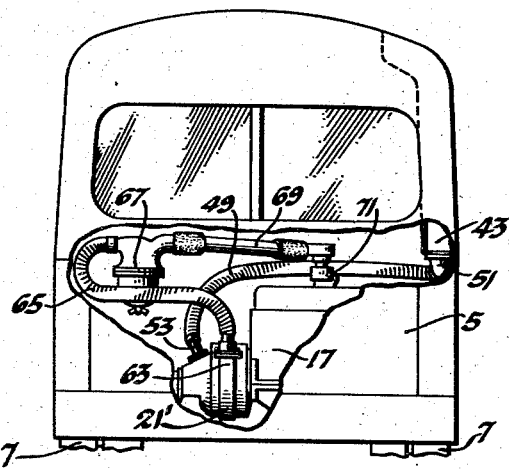
Figure 5 is a view of a motor vehicle coach in end elevation, partly broken away to show a modification.

Referring to the drawings, numeral 5 is used to designate a passenger vehicle of the kind referred to mounted on wheel 7 and driven by power plant represented as a whole by numeral 9. The power plant is placed at the rear end of the vehicle and is located in a space 11 separated by walls such as 13 from the passenger compartment 15. The power plant need not be described in detail, it being merely necessary to state that it includes an engine 17 and a clutch associated with the flywheel 19 of the engine. The flywheel 19 carrying with it a cover 23, is enclosed within a housing 21. As is well-known such a clutch is subject to frictionally developed heat as the driving and driven members engage. Some provision for the dissipation of this heat is very desirable and may be necessary in the case of large buses. It has been proposed to associate with the clutch a scoop of some form to gather in air and direct it against the flywheel. Such air coming from the outside of the bus in the vicinity of the wheels is very likely to be dusty and since it is drawn through the power compartment by the engine driven fan it becomes heated so that its cooling efficiency is greatly diminished.

The present invention aims to overcome the above defects and to provide cooler and cleaner air for the purpose of clutch ventilation.

In Figure 4 there is shown a flywheel 19 together with a cover 23 and the driven shaft 25 extending therefrom. Numeral 27 is merely illustrative of the lever by which the clutch elements within the cover 23 are released. No novelty is alleged for the clutch structure per se. As will be seen from Figure 4 the clutch housing 21 is formed with a plurality of openings 29 in the plane of the flywheel, these openings being distributed circumferentially. These openings 29 are for the outlet of air. For the admission of air an opening 33 is associated with an inwardly directed funnel-shaped stamping 35. This opening 33 may be the opening usually formed in a clutch housing and constituting an inspection opening. Over it is usually placed and secured a closure member. It will be appreciated that if the air entering at 33 passed through the hot engine compartment 11 it would be hot and dusty, the air being drawn in from the outside through the openings of the radiator cover 50 by the engine fan not shown. To obtain cooler air and cleaner air, resort is had to the passenger compartment or to an intake at the front or top of the vehicle. As is customary, the coach is formed with a curved top panel 35' which together with an inner trim panel 36 provides a longitudinal space 37. It will be seen from Figure 2 that the inner trim panel 36 stops short of the panel 35' affording a gap or slot 41 through which the windows 52 may be reciprocated. If air is taken from the passenger compartment 15 it is thus admitted through the slot 41 to the longitudinal space 37. These motor coaches are also built with corner posts enclosing a space 43 as is shown by Figure 3. The space 43 within the corner post (formed by plates 45 and 45') at its upper end is in communication with the space 37. At the bottom of the corner post is a closure plate provided with an opening 47. A flexible tube 49 is provided with end fittings 51 and 53. Fitting 51 is secured over the opening 47 and fitting 53 is secured over the opening 33 as will be seen by reference to Figure 1. The rotary movement of the flywheel drives air out through openings 29 and draws it from the passenger compartment through slot 41, the spaces 37 and 43 and through the flexible conduit and into the housing 21. Since the air comes from the passenger compartment it is cooler than would be the case were it taken as heretofore from the power plant compartment and it is also comparatively free from dust and foreign matter. If the air is taken from a front or top inlet, tube 49 will be connected with said inlet in any convenient way.

Figure 6:
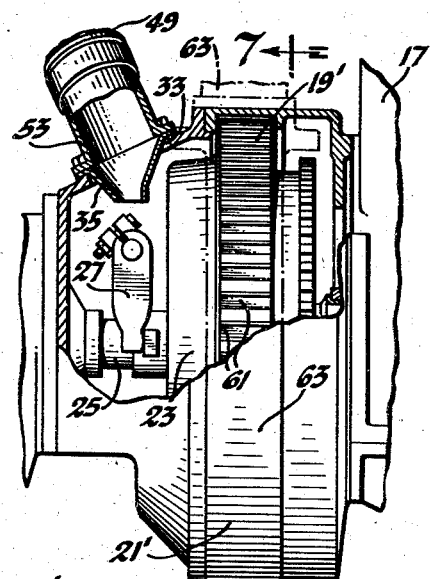
Figure 6 is a view in elevation of the clutch housing of Figure 5, the housing being broken away to show internal structure.
Figure 7:
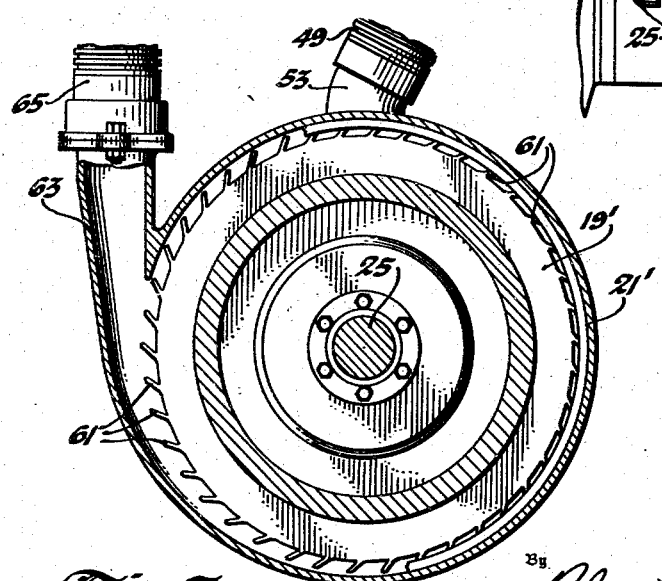
Figure 7 is a section on line 7—7 of Figure 6.

Figure 5 shows a modified form wherein the air which enters the clutch housing for the purpose of cooling the clutch is also used to supercharge the carburetor. In Figures 5 to 7 inclusive the vehicle is marked 5, the wheels 7 and the engine 17, these parts being the same as the corresponding parts shown in Figure 1. The flywheel is marked 19' instead of 19. It is preferably formed with vanes 61. The air current enters through tube 49 and fitting 53, these parts corresponding to the similarly numbered parts in Figure 1. Instead of exhausting through openings 29 in the housing 21 a modified form of housing marked 21' is used in this second form of the invention. This housing 21' is shaped to form a blower housing. It has a discharge opening at 63 for the air. The housing together with the flywheel constitute a blower serving to deliver air under pressure to the delivery port 63. The opening 63 is connected to a tubular pipe 65, the pipe communicating with an air cleaner 67 which latter is itself connected by a pipe 69 to the carburetor 71. It will be seen that air taken from the passenger compartment or other source cools the clutch and serves to supercharge the carburetor. In the event that the supercharger is supplied with air in the way described it will be desirable to take the air from the front or top inlet rather than from the passenger compartment.

I claim:
1. A vehicle having a passenger compartment, a power plant including a clutch housing, said housing having an inspection opening and circumferentially spaced outlet openings, conduit means including a top panel forming together with the interior trim panel of the vehicle a longitudinal passage, said passage communicating at one end with the passenger compartment, a hollow corner post, one end of said corner post being in communication with the second end of the passage, an apertured closure plate for the second end of the hollow corner post and a flexible pipe connecting the inspection opening with the aperture of the closure plate.

2. The invention defined by claim 1, said vehicle having reciprocable windows and the communication between the passenger compartment and the longitudinal passage constituting a slot for the reciprocation of the windows.

HANS O. SCHJOLIN.